United States Patent [19]

Brunson et al.

[11] Patent Number: 4,549,277
[45] Date of Patent: Oct. 22, 1985

[54] MULTIPLE SENSOR INCLINATION MEASURING SYSTEM

[75] Inventors: Amber N. Brunson; Deighton E. Brunson, both of Independence; Walter W. Ray, Jr., Kansas City, all of Mo.

[73] Assignee: Brunson Instrument Company, Kansas City, Mo.

[21] Appl. No.: 529,336

[22] Filed: Sep. 6, 1983

Related U.S. Application Data

[63] Continuation-in-part of Ser. No. 381,546, May 24, 1982, Pat. No. 4,486,844.

[51] Int. Cl.[4] .............................................. G01C 9/06
[52] U.S. Cl. .................................... 364/559; 33/366; 73/1 E
[58] Field of Search ............... 364/559, 550, 556, 570, 364/575; 33/366; 73/1 E

[56] References Cited

U.S. PATENT DOCUMENTS

| | | |
|---|---|---|
| 2,322,681 | 6/1943 | Zenor . |
| 2,592,941 | 4/1952 | Moore . |
| 2,711,590 | 6/1955 | Wilcox . |
| 2,848,710 | 8/1958 | Owen . |
| 2,936,411 | 5/1960 | Doty . |
| 3,009,255 | 11/1961 | Robillard . |
| 3,059,343 | 10/1962 | Kermode . |
| 3,286,357 | 11/1966 | Grumman . |
| 3,421,227 | 1/1969 | Turner et al. . |
| 3,438,266 | 4/1969 | Carow et al. . |
| 3,486,238 | 12/1969 | Hansen . |
| 3,496,565 | 2/1970 | Jenkins ........................ 364/559 X |
| 3,576,124 | 4/1971 | O'Connor ........................ 73/1 E |
| 3,633,003 | 1/1972 | Talwani ........................ 364/559 |
| 3,823,486 | 7/1974 | Bhat et al. . |
| 3,906,471 | 9/1975 | Shawhan . |
| 3,911,592 | 10/1975 | Crask . |
| 4,022,284 | 5/1977 | Crow . |
| 4,028,260 | 6/1977 | Beust . |
| 4,028,815 | 6/1977 | Buckley et al. . |
| 4,077,132 | 3/1978 | Erickson . |
| 4,085,375 | 4/1978 | Galuschak et al. . |
| 4,091,542 | 5/1978 | Schmid et al. . |
| 4,094,073 | 6/1978 | Parra . |
| 4,152,839 | 5/1979 | McDonald . |
| 4,154,000 | 5/1979 | Kramer . |
| 4,167,818 | 9/1979 | Cantarella et al. . |
| 4,468,745 | 8/1984 | Kjosavik ........................ 364/559 |

OTHER PUBLICATIONS

Brochure-Tilt Sensor (Sperry Flight Systems), date unknown.
News Letter-Sperry Flight Systems, dated Jan. 28, 1983.
Engineering Specification (Sperry) dated Feb. 28, 1983.

Primary Examiner—Edward J. Wise
Attorney, Agent, or Firm—Litman, Day and McMahon

[57] ABSTRACT

A multiple sensor inclination measuring system includes a plurality of single and dual axis inclination sensors, each sensor including a bridge circuit for generating a signal or pair of signals, each signal having a voltage which is proportional to the degree of inclination of the sensor, and an analog-to-digital converter to convert the signal to a digital word having a binary value representative of the tilt of the sensor. Each sensor is connected to a support unit which includes a microprocessor, memory, and data communication capabilities. Each support unit may include a look-up table which calibrates the unit specifically to the sensor used. The support units all communicate with a main processing unit which synchronizes the digital conversions of the electrical signals and which has the capability of averaging the angle readings of selected sensors over various lengths of time, determining the difference between angle readings of selected sensors, comparing the rates of inclination of selected sensors, and displaying angle readings, average readings, difference readings, and rates of inclination. The main unit may be connected to a printer for printing hard copies of the angle readings as a function of time.

24 Claims, 6 Drawing Figures

MULTIPLE SENSOR INCLINATION MEASURING SYSTEM

CROSS REFERENCE TO RELATED APPLICATION

This is a continuation-in-part of application Ser. No. 381,546, filed May 24, 1982 now U.S. Pat. No. 4,486,844.

FIELD OF THE INVENTION

The present invention relates to inclination sensing instruments and, more particularly, to a multiple sensor, computer controlled, electronic inclination measuring system.

BACKGROUND OF THE INVENTION

Instruments for determining true horizontal and vertical range from the carpenter's level and plumb bob which have been used nearly since antiquity through precise opto-mechanical instruments, such as optical transit squares, to electro-mechanical instruments such as gyroscopes. Each type of instrument is adequate for a given application with regard to required precision, speed of measurement, and convenience. The majority of the simpler inclination indicating instruments do not provide a quantitative indication of inclination, but merely an indication of whether a test surface is level. Such an indication is adequate for constructing relatively small structures, such as residential buildings of several stories or less, but much greater accuracy is required for building relatively large structures such as skyscrapers, oceangoing vessels and the like.

When a high degree of accuracy is required, optical tooling instruments are often used, such as optical transit squares, by means of which critical points, planes, and surfaces are observed through precise telescopes and related to reference lines or planes. While much greater accuracy can be achieved with such instruments, the actual use of such instruments can be very time consuming. Another disadvantage of such instruments is that their usefulness is decreased when used in moving frames of reference such as on a ship or floating platform at sea.

The use of electrical sensors in cooperation with Wheatstone bridges, Maxwell bridges, and other types of bridge circuits in inclination measuring instruments provides more convenience in determination of inclination without significantly sacrificing accuracy. Most such bridge circuits have been employed with analog type meters which have generally non-linear response across their scales and have a maximum accuracy of about three percent. For this reason, when used with analog type meters, nulling, zeroing, and bridge balancing techniques are generally employed for greatest accuracy. This requires adjusting and reading calibrated dials or switching decade type resistors for the nulling procedure. Such adjustments or switching is also time consuming and in some cases prone to operator error.

Further, gyroscopic inclination sensors have been employed particularly in moving frames of reference such as aircraft and ships. Such instruments are quite adequate for their intended purpose, mainly the indication of relative inclination. However, gyroscopic inclination sensors are subject to error as a result of bearing friction such that they are not adequate for precise measuring.

In some circumstances, it is desirable to monitor the inclination of many portions of a structure. For example, large ships and marine platforms are often subject to flexure of spaced sections due to wave action and thermal cycles as well as movement of the structures as a whole. In such cases, it is desirable to monitor the degree of flexure for safety. There is an ongoing requirement for the alignment of substructures such as propulsion and navigation equipment, certain tools and instruments, and on naval vessels, weapons structures. One requirement for meaningful data in multiple sensor systems is that the taking of readings must be synchronized. Otherwise, it is impossible to accurately compare readings. Such synchronization is most practically achieved in digital inclination measuring systems.

SUMMARY OF THE INVENTION

The present invention provides a multiple sensor inclination measuring system wherein signals from the sensors are simultaneously converted to digital words and transmitted to a main processing unit at a central location for comparison of the readings of selected sensors. Each sensor unit is connected to the main processing unit by a support unit which includes means calibrating same to a specific sensor. The system preferably includes voice channels for vocal communication between the main unit and the support units to facilitate use of the system in aligning structures, particularly in moving frames of reference.

OBJECTS OF THE INVENTION

The principal objects of the present invention are: to provide a system for measuring the inclinations of a plurality of surfaces with respect to gravity; to provide such a system including a plurality of inclination sensor units for placement on the surfaces, a support unit for each sensor unit, and a main processing unit connected and communicating with the support units; to provide such a system wherein each sensor unit includes an inclination sensor which provides a signal having a voltage proportional to the tilt of the sensor and an analog-to-digital converter which converts the signal to a digital word having a binary value representative of the tilt of the sensor; to provide such a system wherein the sensor units are adapted either as single axis sensors for measurement of inclination about a single horizontal axis or as dual axis sensors for inclination measurement about a pair of mutually perpendicular horizontal axes; to provide such a system wherein each support unit is calibrated specifically to the sensor connected thereto by a look-up table stored in a memory thereof; to provide such a system wherein the support units may be provided with function switches and displays for selective stand alone operation independent of the main processing unit; to provide such a system wherein the main processing unit synchronizes the digital conversion of the sensor signals, sequentially queries the support units for digital words, and selectively displays angle readings corresponding to the digital words; to provide such a system wherein the main processor is provided with capabilities for averaging angle readings over selected periods of time, for indicating the difference between the readings of two sensors, for comparing the inclination rates of two sensors, and for freezing the displays to facilitate visual perception of a displayed reading; to provide such a system wherein the main processor may be provided with a tape drive to record angle readings and a printer for hard copies of angle readings as a function of time; and to provide such multiple sensor inclination measuring system which is comparatively economical to manufacture, accurate and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

DETAILED DESCRIPTION OF THE PREFERRED EMBODIMENT

Figure 1:
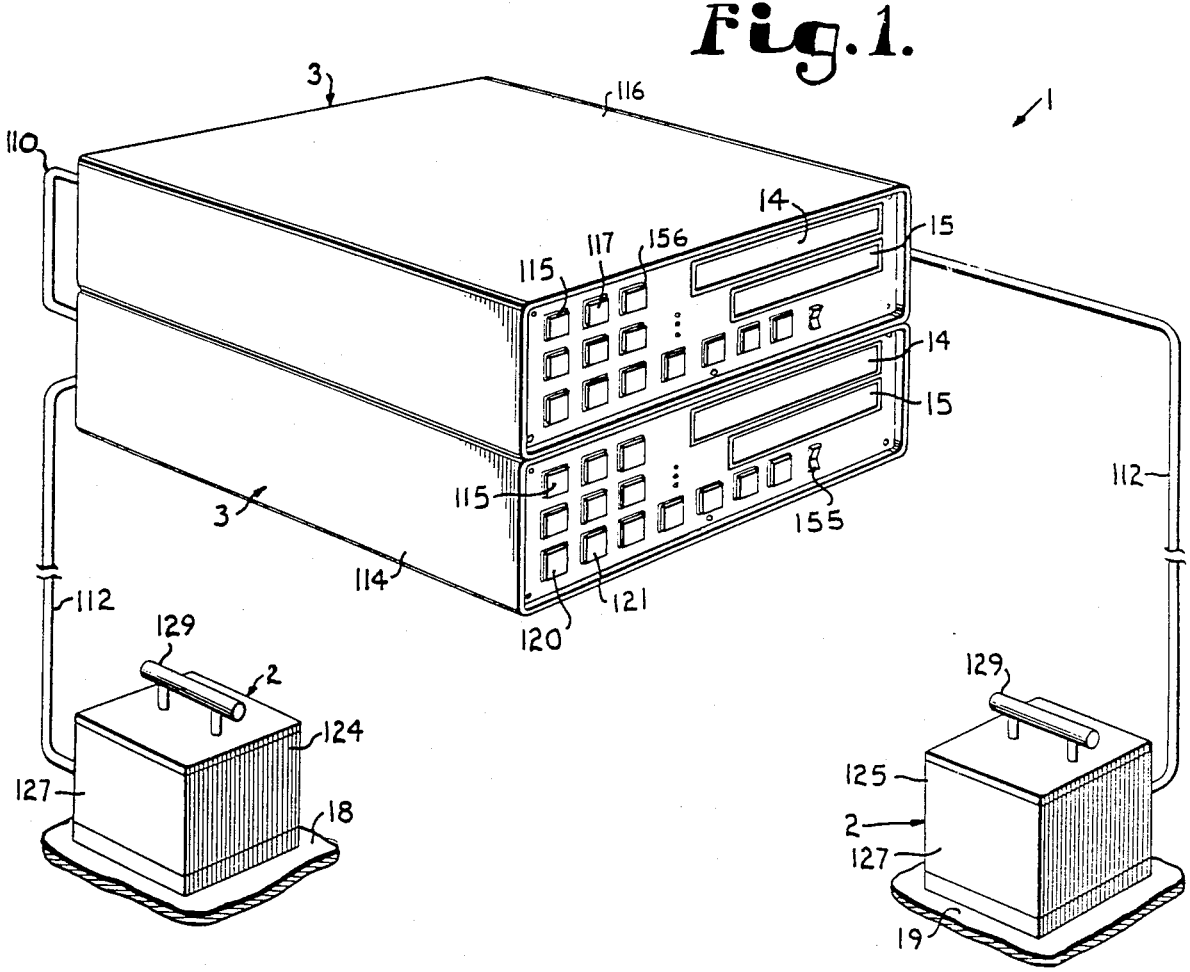
FIG. 1 is a perspective view of two sets of an inclination sensor unit and indicator unit according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally designates a dual axis inclination measuring apparatus, instrument, or system including at least one sensor unit 2 and an indicator unit 3. The sensor unit 2 generally includes a dual axis transducer or sensor element 4 which cooperates respectively with first and second detector circuits such as bridge circuits 5 and 6, FIG. 3, to generate a pair of electrical signals proportional in level to the inclination of the sensor element 4 respectively about first and second mutually perpendicular axes 7 and 8, FIGS. 4 and 5. The sensor unit 2 generally includes digital conversion circuitry 10, FIG. 3, for converting the electrical signals to digital words for processing by a computer 12 to translate the words to respective angle readings for display on digital display devices 14 and 15, FIG. 2.

Figure 4:
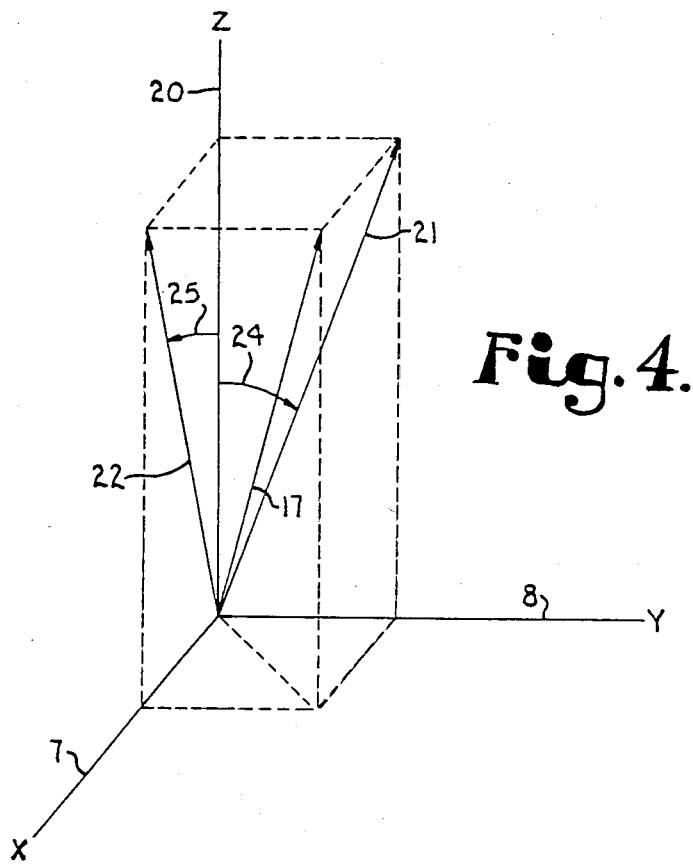
FIG. 4 is a perspective view illustrating the principal parameters of a rectangular Cartesian coordinate system.

Referring to FIG. 4, the instrument 1 is operative to determine and display the angular disposition of a normal vector 17 of a surface 18 or 19, FIG. 1, in relation to a vertical or Z axis 20. The two mutually perpendicular horizontal axes, X axis 7 and Y axis 8, together with the vertical Z axis 20 define a three dimensional rectangular Cartesian coordinate system. A normal vector is used to specify the spatial orientation of a surface or plane, being normal or perpendicular thereto, and often has a magnitude of unity. In the preferred mode of operation of the instrument 1, the normal vector 17 is resolved into a first component vector 21 in the Y-Z plane and a second component vector 22 in the X-Z plane. The angle readings which are displayed on the display devices 14 and 15 are respectively a first angle 24 and a second angle 25. The angle 24 is the angle between the first component vector 21 and Z axis 20 and, further, represents the inclination of the sensor element 4 about the X axis 7. Similarly, the angle 25 is the angle between the second component vector 22 and the Z axis and represents the inclination of the sensor element 4 about the Y axis 8.

The sensor element 4 may be any type of dual axis transducer device which is operative to vary an electrical parameter in proportion to the angles of inclination thereof about the horizontal X and Y axes respectively, 7 and 8. The electrical parameter may be resistance, capacitance, or inductance or combinations thereof. As illustrated in FIG. 1, the sensor element 4 is positioned within the housing 27 of the sensor unit 2 such that the element 4 is level when a lower surface of the housing 27 is level. The housing 27 preferably includes a handle 29 to facilitate handling and placement of the sensor unit 2.

Figure 3:
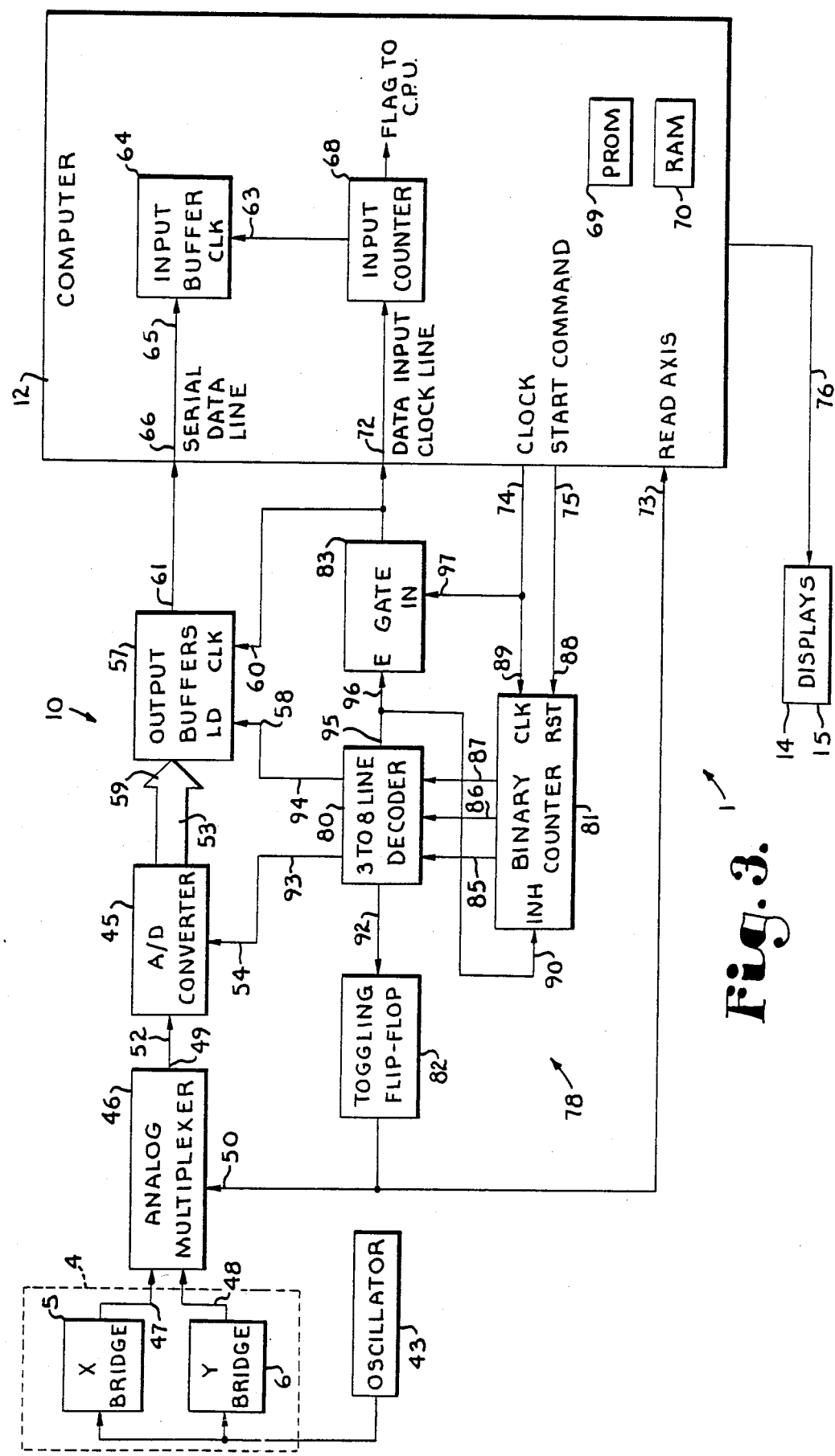
FIG. 3 is a block diagram illustrating the principal functional portions of the inclination measuring apparatus.

Referring to FIG. 3, the X and Y bridge circuits 5 and 6 may be any type of bridge circuit which is compatible with the type of sensor element 4 employed. The sensor element 4 includes circuit elements which are connected in the respective bridge circuits 5 and 6 and which vary an electrical parameter upon inclination of the sensor unit 2 about the X and Y axes 7 and 8, thereby unbalancing the respective bridge circuits 5 and 6. Preferably, each bridge circuit is a rectifying AC excited bridge driven by an oscillator 43 and providing a pair of DC X and Y output voltages which vary in voltage level in proportion to the respective changes in the electrical parameter within the sensor element 4 upon being inclined. The bridge circuits 5 and 6 preferably include amplifiers (not shown) for scaling purposes so that the output signals vary within a desired voltage range.

The voltage level outputs of the X and Y bridge circuits 5 and 6 are converted to digital or binary words by the analog-to-digital (A/D) converter 45 for processing by the computer 12. The individual output signals from the bridges 5 and 6 are alternately fed to the A/D converter 45 by means of an analog multiplexer 46. The multiplexer 46 receives the output from the X bridge 5 on a first signal input 47 and the output from the Y bridge 6 on a second signal input 48. The multiplexer 46 provides at a signal output 49 the analog signal which is present at one of the signal inputs, for example input 47, for a given logic level present at a control input 50 of the multiplexer. When the logical complement of the given logic level is present at the control input 50, the other signal input 45 is selected such that the signal present at input 48 is conveyed to the output 49. The manner of generating the control signal at the control input 50 is set forth hereinbelow.

The analog-to-digital converter 45 may be any one of several types of analog-to-digital converters which is compatible with the remaining components of the circuitry of the instrument 1. Preferably, the illustrated A/D converter 45 is of the successive approximation type with a sixteen bit digital output. The A/D converter 45 is operative to convert each of the analog voltage levels provided by the X and Y bridges 5 and 6, as applied one at a time by the multiplexer 46, to a sixteen bit digital word representative of the voltage level applied to the analog input 52 of the converter 45. The digital word is available at a sixteen bit parallel digital output 53. The conversion process is initiated upon the arrival at the control input 54 of an appropriate logic level.

After conversion of the analog voltage to the digital word, the digital word is loaded into an output buffer register 57 upon receipt of a load signal of the appropriate logic level at a load control terminal 58. The register 57 may be any type of parallel-in/serial-out binary register having a capacity of sixteen bits. The parallel input 59 of the buffer 57 is connected to the output 53 of the converter 45. At the proper time as controlled by the circuitry 10, clock pulses are applied to the clock input 60 of the buffer 57 and to the clock input 63 of an input buffer 64 within the computer 12 in order to clock the digital word out of the output buffer 57, one bit for each clock pulse, and into the input buffer 64.

The input buffer 64 is similar in many respects to the buffer 57 except that the buffer 64 is a serial-in/parallel-out register. The serial output 61 of the buffer 57 is connected to the serial input 65 of the buffer 64 by means of a serial data bus or line 66. The input buffer 64 is addressed as an input/output (I/0) port by the computer 12 in order to retrieve the digital word for further processing.

The computer 12 may be any type of suitable digital computer including a central processing unit, such as a microprocesser (not shown), and support circuitry (also not shown). The illustrated computer 12 particularly includes the input buffer 64; an input counter 68; a read-only memory, such as a programmable read-only memory (PROM) 69; and a random access read-write memory (RAM) 70. The computer 12 has a plurality of connections including, but not limited to, the serial data line 66, the data input clock line 72, and a read axis line 73, all as inputs; and a clock line 74, a start command line 75, and a display output line 76, all as outputs.

The selection of which bridge circuit is to be read, the initiation of the digital conversion process, and the loading of the digital word into the computer 12, are all controlled by the computer 12 through digital control circuitry 78 of the instrument 1. The control circuitry 78 includes a line decoder 80, a binary counter 81, a toggling flip-flop 82, and a logic gate 83. The illustrated counter 81 has three output lines 85, 86, and 87 on which are placed a combination of all logic zeros, for the three bit binary number equal to zero, upon receipt of the start command pulse of the proper logic level at a reset input 88 of the counter 81. Thereafter, each time a clock pulse is received on the clock input 89 of the counter, the binary number on the output lines, 85, 86 and 87 is incremented by one. The counter 81 may be prevented from counting further by placement of a pulse of the proper logic level on an inhibit input 90 of the counter 81.

The line decoder 80 has the outputs 85, 86, and 87 of the counter 81 connected thereto as inputs and is operative to activate or place a selected logic level on a respective output line of the decoder for each combination of logic levels possible on the inputs 85, 86, and 87. The illustrated decoder 80 is a three-to-eight line decoder with only four of the output lines in use. A first output line 92 is connected to the flip-flop 82; a second output line 93 is connected to the control input 54 of the A/D converter 45; a third output line 94 is connected to the load control terminal 58 of the output buffer 57; and a fourth output line 95 is connected to an enable input 96 of the gate 83 and to the inhibit input 90 of the counter 81.

The counter 81 places the condition of 000 on its outputs upon receiving a start command pulse. A first clock pulse thereafter causes output of the counter to be incremented to 001 which causes the first decoder output line 92 to be activated. Activation of the decoder line 92 causes the flip-flop 82 to change the logic state of its output which in turn causes the multiplexer 46 to select the bridge circuit opposite of the one most previously selected. By this means, the analog output of one of the bridge circuits, for example, the X bridge 5, is made available to the A/D converter 45. Since the output of the flip-flop 82 is connected to the read axis input 73 of the computer 12, as the multiplexer 46 is switched, information as to which axis is being read is made available to the computer so that the digital word to be generated will be routed properly.

As the second clock pulse is received by the counter 81, the output is incremented to 010 (decimal 2) whereby the decoder line 92 is deactivated and the second decoder line 93 is activated, thereby causing the digital conversion of the analog voltage level of the X bridge 5 by the A/D converter 45. The digital word representative of the voltage level generated by the X bridge is available at the output 53 of the converter 45. Upon the third clock pulse at the clock input 89 of the counter, the output is incremented to 011 (decimal 3) whereby the decoder line 93 is deactivated and the third decoder line 94 is activated to load the digital word into the output buffer 57.

As the fourth clock pulse of the cycle is received by the counter 81, the third decoder line 94 is deactivated, and the fourth decoder line 95 is activated. The logic level at the output 95 is communicated to the enable input 96 of the gate 83 and to the inhibit input 90 of the counter 81. Inhibiting the counter 81 causes it to ignore forthcoming clock pulses until a reset pulse is received at the reset input 88 of the counter 81. Enabling of the gate 83 routes the clock pulses through the input 97 of the gate to the clock input 60 of the output buffer 57 and to the clock input 63 of the input buffer 64 by way of the input counter 68. The logic gate 83 may be any type of logic gate which is consistent with the logic design of the circuitry 78.

Applying pulses to the clock input 60 of the output buffer 57 causes shifting of the sixteen bit digital word out of the buffer 57 one bit per clock pulse. Similarly, applying pulses to the clock input 63 of the input buffer 64 causes shifting of the bits of the sixteen bit digital word into the buffer 64. The counter 68 counts the clock pulses passing therethrough to the input buffer 64; and when the sixteen bits of the digital word have been counted, the counter 68 sends a pulse or flag to the CPU of the computer 12 to signal that the input buffer 64 has been completely loaded with the sixteen bit digital word representative of the inclination of the sensor element 4 about the X axis 7.

When the CPU of the computer 12 has been flagged, the computer 12 retrieves the digital word therefrom and stores same at a selected address in the RAM 70 for subsequent conversion to an angle reading. After the current digital word has been stored in the RAM 70, the computer 12 sends a start command or reset pulse to the reset input 88 of the binary counter 81, and the whole process is repeated, such that the voltage level generated by the Y bridge 6 is converted to a digital word for conversion to an angle reading. When the decoder line 92 is selected by the decoder 80, the output logic level of the flip-flop 82 is complemented such that the multiplexer 46 makes the Y bridge voltage level, present at the input 48 of the multiplexer, available at the output 49 thereof for conversion by an A/D converter 45.

The program for operating the instrument 1 is stored on a read-only memory within the computer 12. Any type of read-only memory may be employed; and preferably, a programmable read-only memory (PROM), such as the PROM 69 is used to store the control program. Further, the PROM 69 may be used to store a look-up table for calibrating the instrument 1. The PROM 69 and the RAM 70 each may consist of a plurality of integrated circuits or chips.

Because of manufacturing tolerances, there will be slight variations in the electrical responses of the sensor elements 4 to a given inclination. Further, there will be slight differences in the other electrical components of the bridge circuits 5 and 6. In order to attain the highest degree of precision from each instrument 1 and ensure consistancy of operation, each computer 12 is preferably calibrated for operation exclusively with a single sensor unit 2.

The exemplary analog-to-digital converter 45 makes 192 conversions per second, alternating between the X and Y bridges 5 and 6. The computer 12 stores 32 successive test digital words for each axis; and the computer 12 determines the binary average of the 32 test words and then consults the look-up table in the PROM 69 to convert the averaged test word to one of the angle readings 24 or 25. The computer 12, therefore, updates each of the displays 14 and 15 three times per second. Averaging the test words results in greater accuracy since the effects of system noise are lessened over the averaging time interval.

Figure 2:
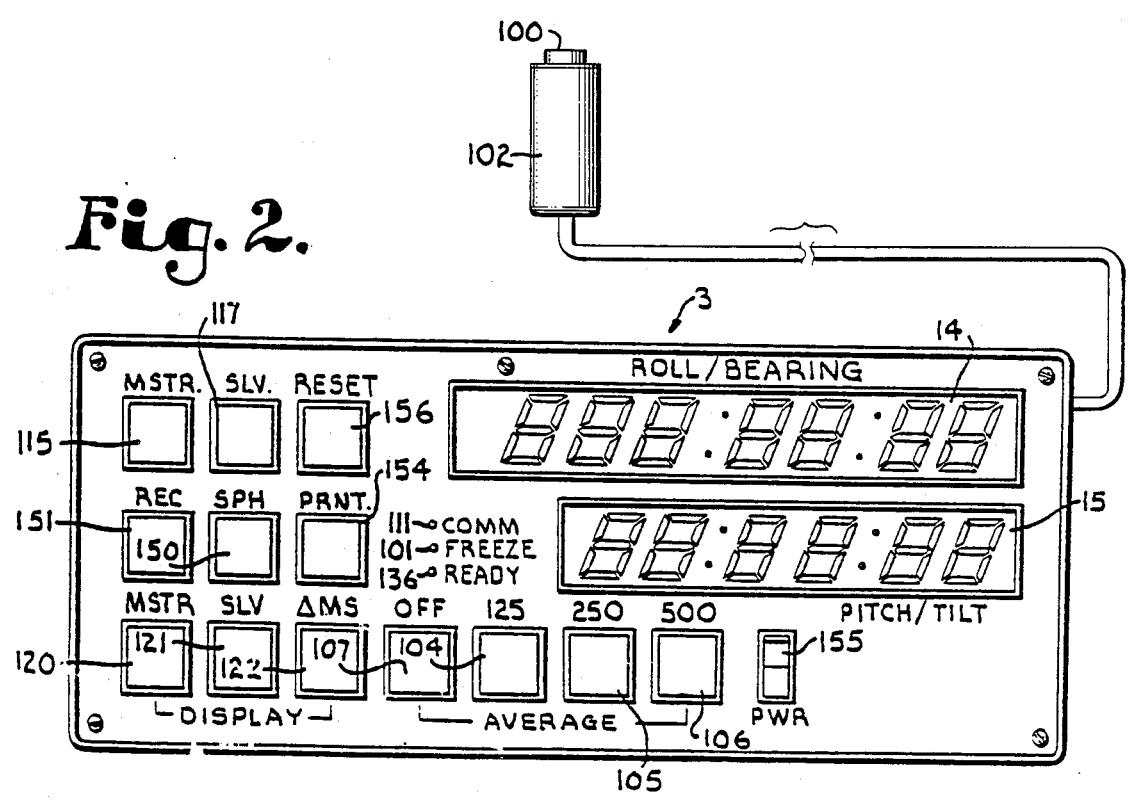
FIG. 2 is an enlarged elevational view of a control panel of the indicator unit.

Referring to FIG. 2, the indicator unit 3 preferably includes a freeze switch 100 which is operable to freeze the displays 14 and 15 for reading by a human operator. Since the displays 14 and 15 are updated at one-third second intervals, the displays would otherwise tend to flicker, especially in the less significant digits, and would be difficult to read by a human operator. Operation of the freeze switch 100 causes the angle readings which are current as the switch 100 is pressed to be stored in the RAM 70 and appear to be displayed continuously without updating. The freeze indicator light 101 advises the operator that the indicator unit 3 is in the freeze mode. Pressing the freeze switch 100 while in the freeze mode causes exiting of the freeze mode, and updating of the displays 14 and 15 resumes. Exiting of the freeze mode is indicated by the freeze indicator light 101 being extinguished. The freeze switch 100 may be provided on the panel of the indicator unit 3 or, as illustrated, in a remote freeze switch unit 102.

The instrument 1 is capable of averaging readings for each axis over a relatively long interval to nullify or minimize the effects of mechanical vibrations and periodic motions such as occur on an oceangoing vessel or platform. The indicator unit 3 includes a 125 second average switch 104, a 250 second average switch 105, a 500 second average switch 106, and an OFF switch 107 for exiting the averaging mode. Upon operating one of the averaging switches 104–106, the test digital words are stored until thirty-two have been received and then averaged to result in the normal averaged test digital words. Each averaged test digital word is then stored in the RAM 70 throughout the averaging interval, as determined by which average switch 104–106 has been pressed. At the end of the averaging interval, a binary average of the averaged digital words is determined. The resultant average is applied to the look-up table in the PROM 69 to determine the angle reading corresponding thereto. If it is desired to exit the averaging mode before the end of the averaging period, the OFF switch 107 may be pressed, and the displays 14 and 15 are again updated at one-third second intervals.

Referring to FIGS. 1 and 2, the instrument 1 is particularly adapted for use in pairs thereof to indicate the difference in inclination of two remote surfaces 18 and 19 with respect to two parallel sets of mutually perpendicular horizontal axes. One of the surfaces, for example, surface 18, may be a datum or reference platform, as on a ship; and the other surface 19 may be a surface on a structure, such as antenna structure, which is to be aligned relative to the reference surface 18. The two indicator units 3 are interconnected by means of a cable 110. Each indicator unit 3 has a communication indicator light 111 which is illuminated when the two indicator units 3 are in proper communication. The illustrated indicator light 111 on each unit 3 may be operative to blink if the two indicator units 3 are in proper communication but the associated sensor unit 2 is not sending data thereto because of a fault in the cable 112 connecting the sensor unit 2 to the associated indicator unit 3.

When the indicator units 3 have been interconnected, one of the units, preferably the indicator unit 114, is designated the master unit by operating the master designation switch 115 on the unit; and the other unit, indicator unit 116, is designated the slave unit by operating the slave designation switch 117. The indicator units 114 and 116 are preferably identical, but designating one the master and the other the slave unit determines which one is the reference unit for differencing purposes. It is also possible to operate each unit as a master unit by operating the master designation switch 115 on each.

Each indicator unit 3 includes three display mode switches: a master display switch 120, a slave display switch 121, and a difference display switch 122. Operation of the master display switch 120 on the master indicator unit 114 causes the angle readings, as determined by the master sensor unit 124 connected thereto, to be displayed on the display devices 14 and 15 of the master indicator unit 114. Operation of the slave display switch 121 on the master indicator unit 114 causes the angle readings, as determined by the slave sensor unit 125, to be displayed on the master indicator unit 114. Operation of the difference display switch 122 on the master indicator unit 114 causes the angle readings of the slave unit to be subtracted from the angle readings of the master unit and the difference angle readings to be displayed on the master unit 114. In a similar manner, the master, slave and difference angle readings may be displayed on the display devices 14 and 15 of the slave indicator unit 116 by operation of the appropriate display switches 120–122.

The indicator units 114 and 116 may be connected to an alarm system (not shown) such that a difference angle reading in excess of a selected angle would cause an alarm to sound. Such a set up would be useful, for example, on a large oceangoing tanker ship. Such ships are subject to a degree of flexure and torque due to wave action because of the extreme length of the hull structure. The master sensor unit 124 could be positioned on a reference platform 18 of the tanker, and the slave sensor unit 125 could be placed on a surface at one of the extremities of the tanker. The alarm system would be set to sound at a critical degree of flexure so that speed could be reduced or direction changed to avoid overstressing the hull which could ultimately lead to failure and loss of the ship and cargo.

The differencing feature of the instrument 1 greatly facilitates the alignment of substructures of a ship at sea, since the effects of rolling and pitching of the ship are nullified. The substructure may be coarsely aligned or positioned using conventional leveling instruments, then finely aligned with the instrument 1 by adjusting the substructure until the difference angle readings are substantially zero.

Referring to FIGS. 1 and 3, the housing 27 has the sensor element 4, the bridge circuits 5 and 6, the digital conversion circuitry 10, and the digital control circuitry 78 mounted therein. Intercommunication between the sensor unit 2 and indicator unit 3 is accomplished by digital signals only to thereby increase accuracy and reliability.

Figure 5:
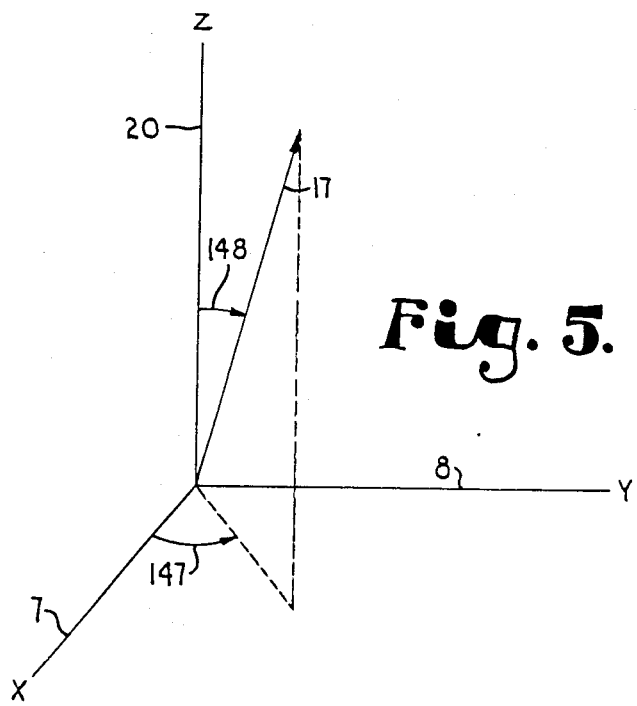
FIG. 5 is a view similar to FIG. 4 and illustrates the principal parameters of a spherical coordinate system.

Referring to FIGS. 3, 4 and 5, the instrument 1 is adapted to read out in the angles of the normal vector components 21 and 22 with respect to the Z or vertical axis 20, that is respectively, the angles 24 and 25. The angle 24 is designated a roll angle, or inclination from side to side, and displayed on the display device 14. The angle 25 is designated a pitch angle, or inclination fore and aft, and displayed on the display device 15. Such angles are referred to as rectangular components and are defined with respect to the rectangular coordinate system illustrated in FIG. 4.

The instrument 1 is also adapted to read out in the angles of a spherical coordinate system, FIG. 5. The angles of interest in the spherical coordinate system are a bearing angle 147, which is the angle between the X axis 7 and the plane containing the normal vector 17 and the Z axis 20, and a tilt angle 148 which is the true angle between the normal vector 17 and the Z axis 20. In some circumstances, use of the spherical coordinate angles 147 and 148 is more convenient than the rectangular coordinate angles 24 and 25.

Upon power-up, the instrument 1 is in the rectangular coordinate mode. The spherical coordinate mode may be selected by operating the spherical mode switch 150. The instrument 1 may be returned to the rectangular mode by operation of the rectangular mode switch 151. The preferred embodiment of the instrument 1 always measures inclination in terms of the rectangular coordinate angles 24 and 25. When the spherical mode is selected, the control program causes the rectangular coordinate angles 24 and 25 to be converted to the spherical coordinate angles 147 and 148 by the use of conventional trigonometric identities. The bearing angle 147 is displayed on the display device 14, and the tilt angle 148 is displayed on the display device 15.

As illustrated in FIG. 3, a print switch 154 is provided to cause the angle readings which are displayed on the devices 14 and 15 to be printed along with, for example, the time and date that the readings are taken. This provides a permanent record of the inclinations measured by the instrument 1. Pressing the print switch 154 actuates a printer (not shown) which is connected to the indicator unit 3. Pressing the print switch while in the print mode causes exiting of the print mode and deactivation of the printer. The indicator unit 3 includes a power switch 155 for applying electrical power to the instrument 1. Upon powerup, the computer 12 is reset and begins execution of the control program. The indicator unit 3 may also be provided with a separate reset switch 156 for operation in the event that obvious errors are noticed in the displayed readings due to causes such as power line transients or surges.

The sensor unit 2 and indicator unit 3 are described and illustrated as being constructed in separate housings. However, under some circumstances, it might be desirable to provide the sensor unit 2 and indicator unit 3 in a single housing. Further, each indicator unit 3 is illustrated as having a single sensor unit 2; however, it would be conceivable to connect several sensor units 2 to a single indicator unit 3 along with suitable switching circuitry for activating and taking readings with the selected sensor unit 2.

Figure 6:
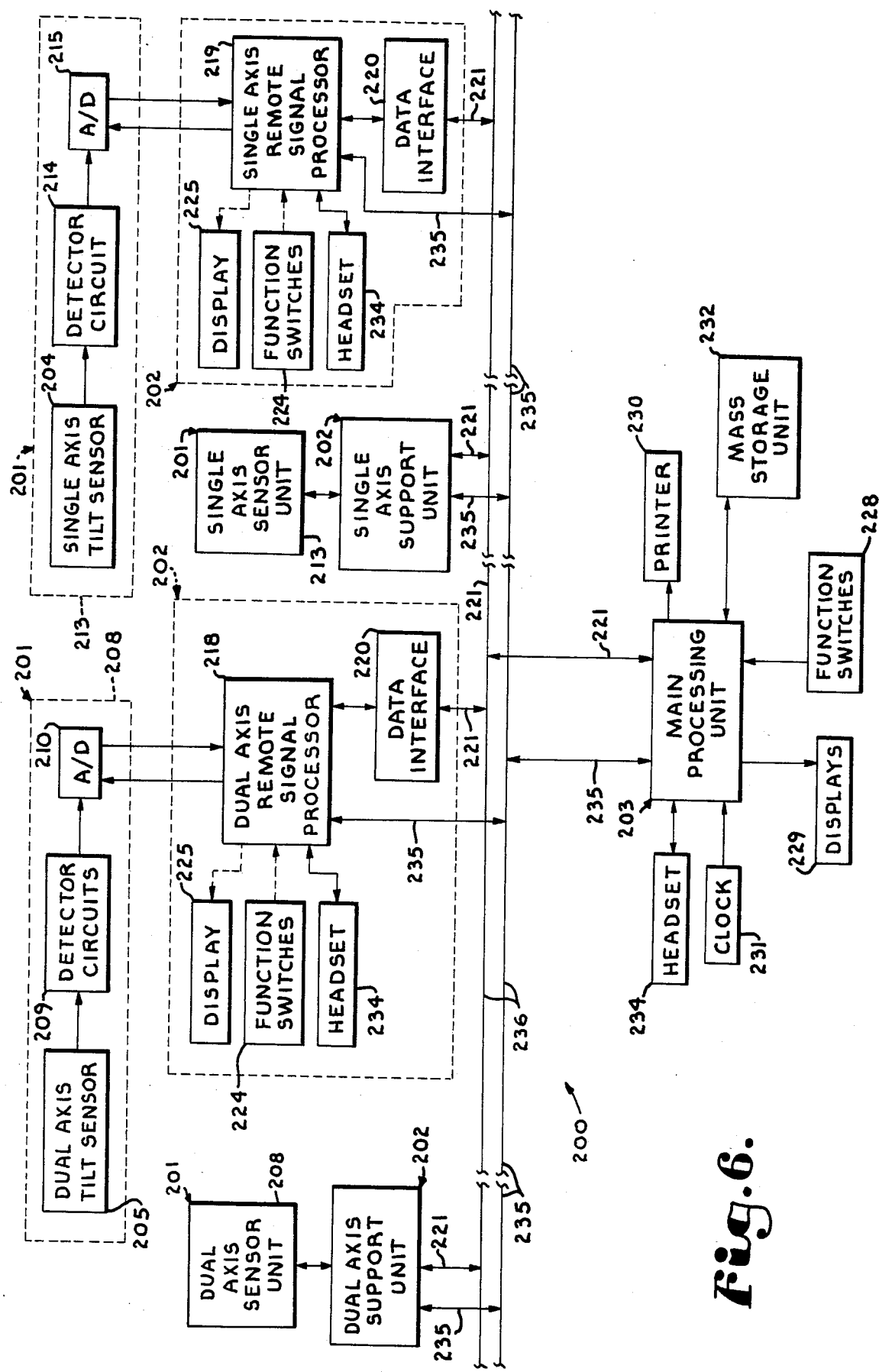
FIG. 6 is a block diagram illustrating a multiple sensor inclination measuring system according to the present invention.

FIG. 6 illustrates a multiple sensor inclination measuring system 200 including a plurality of sensor units 201 similar to the sensor unit 2 and connected to a plurality of support units 202 similar in many respects to the indicator unit 3. In the system 200, the support units 202 are connected to and communicate with a main processing unit 203. The main processing unit 203 synchonizes the digital conversion of the signals from the inclination sensors which may be either single axis sensors 204 or dual axis sensors 205. The main processing unit 203 has the cabability for performing operations on the angle readings to facilitate use of the system 200 in monitoring the inclinations of a plurality of surfaces.

Each dual axis sensor unit 208 is substantially similar to the sensor unit 2 of the inclination measuring instrument 1 and includes a dual axis tilt transducer or sensor 205 operative to vary an electrical parameter in proportion to the degree of tilt thereof, detector circuits 209, such as a bridge circuit or other type of circuit operative to generate a voltage or current proportional in level to the variation in the parameter caused by tilting of the sensor, and including a detector circuit associated with each of the axes about which the sensor 205 senses inclination, and an analog-to-digital converter 210. The A/D converter 210 may be a dual channel converter or, preferably, includes multiplexing circuitry similar to the digital conversion circuitry 10 of the instrument 1. The single axis sensor units 213 are similar to the dual axis units 208 except for simplification for sensing tilt about a single axis. More particularly, a single detector circuit 214 is required for generating a single axis sensor signal, and the single axis A/D converter 215 does not require the multiplexing circuitry employed in the dual axis A/D converter 210. The system 200 may include dual axis sensor units 208 and single axis sensor units 213 in the same system as needs dictate. The dual axis sensors 205 of a system are aligned in such a manner to indicate inclination about respective parallel sets of mutually perpendicular horizontal axes as shown in FIG. 4. Each single axis tilt sensor 204 is oriented to indicate inclination about a single axis parallel to one of the horizontal axes 7 or 8 as needed.

The support units 202 are basically dedicated digital computers and generally provide interfacing between the sensor units 201 and the main processing unit 203. The support units 202 for single axis sensor units 213 and dual axis sensor units 208 may be substantially similar since in a preferred embodiment the dual axis support units process a single digital word at a time. The support units 202 relay conversion initiation signals from the main processing unit to the associated A/D converters and receive and store digital words from the converters until commanded to transmit the words to the main processing unit 203. In addition, the support units are calibrated specifically to the sensor unit 201 employed therewith by the same means employed in the computer 12 of the instrument 1. That is, a look-up table is stored in a memory of each support unit which relates words received from the associated A/D converter to binary representations of true inclination of the associated sensor unit 201. The support units 202 operate by execution of a program preferably stored in a PROM memory. Therefore, the only difference between a dual axis remote signal processor 218 of a dual axis support unit 202 and a single axis remote signal processor 219 of a single axis support unit is in the content of the associated PROM. In addition to the difference in control programs between the dual axis and single axis remote signal processors 218 and 219, each dual axis processor 218 requires a pair of look-up tables associated respectively with the dual axes to which the associated dual axis sensor 205 is related, whereas the single axis signal processors 219 only require a single look-up table.

Each support unit 202 includes a serial data interface 220 for communication over a serial data bus 221 with the main processing unit 203. Preferably the serial bus 221 is a standardized serial bus and adheres to one or more of the RS-232 conventions. Preferably, the processors 218 and 219 perform short term averaging on the digital words received from the respective A/D converters 210 and 215 prior to the look-up table calibration function. That is, each processor stores a selected number of digital words from the associated A/D converter, calculates a binary average, compares the averaged word to entries in the associated lookup table, and stores the appropriate digital word for transmission to the main processing unit 203.

The support units 202 may be adapted for substantially permanent installation and more or less unattended operation under the control of an operator at the main processing unit 203. Alternatively, the support units 202 can be adapted for stand alone operation independent of and disconnected from the main processing unit 203. For this purpose, the processors 218 and 219 may be provided with function switches 224 and display devices 225. In addition, the stand alone configurations of the support units 202 would be provided with appropriate software routines for servicing the function switches 224 and displays 225.

The main processing unit 203 is a digital computer and includes function switches 228, displays 229 and preferably a printer 230. As stated previously, the main unit 203 synchronizes the digital conversion of the signals from the sensors 204 and 205 and retrieves the digital words representing angle readings from the support units 202. The angle readings may then be selectively displayed on the displays 228 and/or printed as a function of time by the printer 230. The main unit 203 preferably includes a real time clock 231 therein for generating representations of the current clock time particularly for printing along with the angle readings. In addition, the main unit 203 may be provided with a mass storage unit 232 such as a tape cassette drive or disc drive for recording the readings for subsequent printing or analysis.

The function switches 228 may be a conventional, general purpose, alphanumeric keyboard or a set of preset function switches, and the display 229 may be a CRT display or segmented digital displays. In a preferred embodiment of the system 200, a portion of the display 229 is provided by a dot matrix liquid crystal display (LCD) panel, and a portion of the function switches 228 is provided by a transparent membrane switch panel overlaid on the LCD panel. Such an LCD display would be programmed for menu selection of desired functions by touching the panel at indicated positions. In addition, more conventional switches and displays could be provided for frequently used functions such as a power switch, a reset switch, a main menu switch or the like (not shown).

The main processing unit 203 is programmed to perform operations on the readings to better utilize the data obtained by the system 200. Such operations include the averaging of angle readings over selected periods of time, the freezing of displayed readings, the determination of the difference of inclination of selected sensors, and the comparison of the rates of inclination of selected sensors. The averaging of readings over selectable periods of time allows the effects of vibration and recurrent motion to be nullified. The freezing of displayed data facilitates reading of the data by human operators. The differencing function facilitates the orientation of substructures relative to a reference orientation, particularly in moving frames of reference. The rate comparison feature is also useful in dynamic situations, such as on ships, and indicates whether a substructure is moving as a unit with a main structure or is resiliently flexing relative thereto. With regard to the differencing and rate comparison features, two single axis sensors 204 must be oriented about mutually parallel axes for meaningful comparison of the inclination or rates of inclination thereof.

The system 200 is provided with voice communication capabilities so that operators at the main unit 203 and at remote support units 202 can cooperate in use of the system, for example, to align a substructure relative to a reference plane. The main unit 203 and each support unit 202 is provided with audio amplifiers, controls, and switches (not shown). Each unit is also provided with jacks to receive audio transducers represented by the headsets 234 illustrated in FIG. 6 and consisting of earphones and microphones. The audio amplifiers of the units 202 and 203 are interconnected by an audio cable 235. The serial bus connectors 221, audio cable 235, and, under some circumstances, a power cable (not shown) may be combined as a single umbilical cable 236 to interconnect the main processing unit 203 with the support units 202.

The system 200 is utilized in substantially the same manner as the instrument 1. However, the system 200 is more modular and versatile than the instrument 1. The number of sensor-support unit sets which can be monitored by the main unit 203 is not strictly limited. However, as the number of units monitored increases beyond a certain number, the resolution of readings for a given sensor, that is, the number of angle readings per unit time begins to decrease.

It is to be understood that while certain forms of the present invention have been illustrated and described herein, it is not to be limited to the specific forms or arrangement of parts described and shown.

What is claimed and desired to be secured by Letters Patent is as follows:

1. A method of determining the inclinations of a plurality of surfaces comprising the steps of:
   (a) placing a plurality of inclination sensors on a plurality of respective surfaces, each sensor varying an electrical parameter in proportion to the degree of inclination of said sensor;

(b) generating a respective electrical signal in cooperation with each sensor, each signal having a signal property which varies in proportion to the variation in said electrical parameter, whereby said signal property varies in proportion to the inclination of the associated sensor from a reference inclination;

(c) simultaneously converting each electrical signal to a digital word representative of the variation of said signal property from a reference value thereof, the binary value of said digital word being representative of the inclination of the sensor associated with said signal;

(d) storing each digital word in a support memory of a respective support unit;

(e) selectively transmitting each word to a main processor including a main memory and a display means;

(f) translating each digital word transmitted to said main processor to an angle reading substantially equal to the inclination of the associated sensor; and (g) selectively displaying the angle readings on said display means.

2. The method set forth in claim 1 including the steps of:

(a) selectively initiating the conversion of one of said electrical signals to an associated digital word at the support unit associated with said signal;

(b) at said support unit, translating said associated digital word to an associated angle reading substantially equal to the inclination of the sensor associated with said one signal; and (c) on a support display means of said associated support unit, displaying said associated angle reading.

3. The method set forth in claim 1 including the steps of:

(a) in said support memory of one of said support units, storing over a selected period of time successive digital words corresponding to angles of inclination of the inclination sensor associated with said one support unit;

(b) in said one support unit, calculating an average digital word substantially equal to the average of the binary values of said successive digital words;

(c) transmitting said average digital word to said main processor;

(d) translating said average digital word to an average angle reading; and (e) selectively displaying said average angle reading on said display means.

4. The method set forth in claim 1 wherein:

(a) a displayed angle reading for an associated sensor is periodically updated at a rate which is too fast for visual perception by an average human; and including the steps of:

(b) selectively effecting the storage in said main memory of an angle representation of an angle reading of said associated sensor which is current at a selected instant; and (c) displaying an angle reading corresponding to said angle representation.

5. The method set forth in claim 4 including the steps of:

(a) selectively effecting the storage in said main memory of a plurality of representations of the angle readings associated respectively with a plurality of said sensors which are current at a selected instant; and (b) displaying the angle readings corresponding respectively to said representations for comparison of the inclinations of the sensors associated with said angle readings at said selected instant.

6. The method set forth in claim 1 including the steps of:

(a) in said main processor, subtracting a first angle reading associated with a first surface from a second angle reading associated with a second surface resulting in a difference angle reading substantially equal to the difference in inclination of the first and second surfaces; and (b) displaying said difference angle reading on said display means.

7. The method set forth in claim 1 including the steps of:

(a) storing in said main memory early angle readings respectively for a first inclination sensor and a second inclination sensor;

(b) storing in said main memory late angle readings respectively for said first and second sensors obtained at a selected time period after obtaining said early angle readings;

(c) in said main processor determining the subtractive difference respectively between said early angle readings and said late angle readings resulting in a first difference angle reading and a second difference angle reading;

(d) in said main processor, dividing each difference angle reading by a number representing said selected time period resulting in a first sensor inclination rate and a second sensor inclination rate; and (e) displaying an indication of said first and second inclination rates on said display means.

8. The method set forth in claim 7 wherein said displaying step includes:

(a) displaying a numeric representation of said first and second inclination rates.

9. The method set forth in claim 1 including the step of:

(a) calibrating each support unit for variation in the binary value of the digital word associated with said support unit in substantially linear proportion to the variation in the inclination of the associated sensor within a selected range of inclination thereof.

10. The method set forth in claim 1 wherein:

(a) at least one of said inclination sensors is a dual axis inclination sensor operative to vary an electrical parameter in proportion to the degree of inclination of said dual axis sensor about each of a pair of mutually perpendicular horizontal axes;

(b) generating a pair of said electrical signals for said dual axis sensor, each signal being associated with a respective one of said axes;

(c) in the support unit associated with said dual axis sensor, converting each of said pair of signals to an associated one of said digital words;

(d) transmitting the pair of digital words to said main processor;

(e) translating each of said pair of digital words to an angle reading substantially equal to the inclination of said dual axis sensor about the associated one of said horizontal axes; and (f) displaying each of the pair of angle readings on said display means.

11. The method set forth in claim 10 including the step of:
   (a) selectively converting said pair of angle readings into a second pair of angle readings in a spherical coordinate system.

12. A multiple sensor inclination measuring system comprising:
   (a) a plurality of inclination sensors for placement on respective surfaces to determine the inclination thereof, each sensor being operative to vary an electrical parameter in proportion to the degree of inclination of said sensor;
   (b) a plurality of circuit means connected respectively to said sensors, each circuit means providing an electrical signal having a signal property which varies in proportion to the variation of said electrical parameter of the sensor connected thereto upon the inclination of said sensor;
   (c) a plurality of analog-to-digital (A/D) converters operatively connected respectively to said circuit means, each A/D converter converting the signal from the associated circuit means to a digital word having a binary value representative of the variation of said signal property of said signal from a reference value thereof;
   (d) a plurality of support units connected respectively to said A/D converters and controlling the operation thereof, each support unit including support memory means for storing a digital word representing the inclination of the associated inclination sensor and support unit data communication means for transmitting said digital word and for receiving commands;
   (e) a main processor including a main data communication means connected to said support unit data communication means of said support units and including a main memory, a main display, and operation switches; and
   (f) said main processor being operative to transmit commands to said support units to cause the simultaneous conversion of said electrical signals to respective digital words, to cause the transmission of said words to said main processor, to cause the translation of said words to respective angle readings, and to cause the display of said readings on said main display.

13. The system set forth in claim 12 wherein:
   (a) said main processor includes digital computer means programmed to perform the functions thereof.

14. The system set forth in claim 12 wherein:
   (a) each support unit includes a support unit digital computer means programmed to perform the functions thereof.

15. The system set forth in claim 12 wherein at least one of said support units includes:
   (a) a support display means;
   (b) a support unit A/D conversion switch;
   (c) support unit computer means operative to cause the conversion of the signal associated with said support unit to one of said digital words, to translate said one digital word to an angle reading, and to display said angle reading in response to the operation of said A/D conversion switch; and
   (d) said support unit being operable independent of said main processor.

16. The system set forth in claim 12 wherein:
   (a) at least one of said inclination sensors is a dual axis sensor operative to vary said electrical parameter in proportion to the inclination of said dual axis sensor about each of a pair of mutually perpendicular horizontal axes;
   (b) the circuit means associated with said dual axis sensor is a dual axis circuit means and provides a pair of said electrical signals, each signal being associated with a respective one of said horizontal axes;
   (c) the A/D converter associated with said dual axis circuit means converts each of said pair of signals to one of said digital words;
   (d) the support unit associated with said dual axis sensor is operative to transmit a pair of said digital words associated respectively with said pair of horizonal axes to said main processor;
   (e) said main processor is operative to translate said pair of digital words to a pair of angle readings substantially equal respectively to the inclination of said dual axis sensor about said pair of horizontal axes; and
   (f) said main processor is operative to display said pair of angle readings on said main display.

17. The system set forth in claim 12 wherein:
   (a) each support unit includes means calibrating same to the associated sensor for variation of the binary value of the associated digital word in substantially linear proportion to the variation in the inclination of the associated sensor within a selected range of inclination thereof.

18. The system set forth in claim 12 including:
   (a) at least some of said support units being positioned remotely from said main processor; and
   (b) vocal communication means associated with said main processor and at least the remotely positioned support units and providing for vocal communication between an operator at said main processor and operators at said remotely positioned support units to facilitate use of said system.

19. The system set forth in claim 12 including:
   (a) difference switch means on said main processor which is operable to cause the subtraction of an angle reading associated with one of said inclination sensors from the angle reading associated with another of said sensors resulting in a difference angle reading and to cause the display of said difference angle reading on said main display.

20. The system set forth in claim 12 including average switch means on said main processor operable to cause:
   (a) the storage in said main memory over a selected period of time of a plurality of representations of successive angle readings associated with one of said inclination sensors;
   (b) the calculation of an average angle reading associated with said one sensor; and
   (c) the display of said average angle reading on said main display.

21. The system set forth in claim 12 wherein:
   (a) the displayed angle readings are updated at a rate which is too fast for visual perception of said displayed angle readings by an average human; and
   (b) said main processor includes a freeze display switch means operable to cause:
      (1) the storage in said main memory of a plurality of angle readings which are current upon the operation of said freeze display switch means; and (2) the display of the stored plurality of angle readings on said main display.

22. The system set forth in claim 12 including:
(a) rate comparison switch means on said main processor operable to cause the calculation of the rates of inclination of a first and second of said inclination sensors; and
(b) rate comparison display means on said main processor operative to indicate a difference in the rates of inclination of said first and second sensors.

23. The system set forth in claim 12 including:

(a) a printer connected to said main processor and selectively operable to print said angle readings for permanent recording thereof.

24. The system set forth in claim 12 including:
(a) clock means associated with said main processor and operative to generate a representation of current clock time; and
(b) a printer connected to said main processor and selectively operable to print said angle readings and the current clock time at which said angle readings are recorded.

* * * * *